US010822103B2

(12) United States Patent
Joshi et al.

(10) Patent No.: US 10,822,103 B2
(45) Date of Patent: Nov. 3, 2020

(54) PROPULSOR ASSEMBLY FOR AN AIRCRAFT

(71) Applicant: General Electric Company, Schenectady, NY (US)

(72) Inventors: Narendra Digamber Joshi, Niskayuna, NY (US); Michael Solomon Idelchik, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 341 days.

(21) Appl. No.: 15/672,448

(22) Filed: Aug. 9, 2017

(65) Prior Publication Data
US 2018/0229851 A1    Aug. 16, 2018

Related U.S. Application Data

(63) Continuation-in-part of application No. 15/430,052, filed on Feb. 10, 2017.
(Continued)

(51) Int. Cl.
*B64D 31/06* (2006.01)
*B64D 27/18* (2006.01)
(Continued)

(52) U.S. Cl.
CPC ............ *B64D 31/06* (2013.01); *B64D 27/18* (2013.01); *B64D 27/24* (2013.01); *F02C 9/16* (2013.01);
(Continued)

(58) Field of Classification Search
None
See application file for complete search history.

(56) References Cited

U.S. PATENT DOCUMENTS 2,812,912 A   11/1957  Stevens et al.
3,041,465 A    6/1962  Ayre
(Continued)

FOREIGN PATENT DOCUMENTS

GB       2489311 A       9/2012
WO   WO2010/020199 A1   2/2010
(Continued)

OTHER PUBLICATIONS

Secunde et al., "Integrated engine-generator concept for aircraft electric secondary power", Auxiliary systems, NASA Technical Reports Server (NTRS), pp. 22, Jun. 1, 1972.
(Continued)

*Primary Examiner* — Shelley Chen
(74) *Attorney, Agent, or Firm* — Christopher R. Carroll; The Small Patent Law Group LLC

(57) ABSTRACT

An aircraft propulsor assembly includes a fan having a nacelle and plural fan blades radially disposed within the nacelle. The fan blades are configured to be rotated by torque generated by a turbine engine of an aircraft to generate thrust for propelling the aircraft. The assembly also includes an electric motor including a stator in the nacelle of the fan and a rotor in tips of two or more of the fan blades. The electric motor is configured to generate torque that also rotates the fan blades to generate thrust for propelling the aircraft. The assembly also includes a controller configured to reduce or prevent an increase in an operating temperature of the turbine engine of the aircraft by automatically supplanting at least some of the torque generated by the turbine engine with the torque generated by the electric motor.

17 Claims, 2 Drawing Sheets

Related U.S. Application Data

(60) Provisional application No. 62/509,402, filed on May 22, 2017.

(51) Int. Cl.
    *B64D 27/24*           (2006.01)
    *F02C 9/16*            (2006.01)
    *G05D 17/02*           (2006.01)
    *B64D 27/02*           (2006.01)
    *B64D 33/02*           (2006.01)

(52) U.S. Cl.
    CPC .. *B64D 2027/026* (2013.01); *B64D 2033/024* (2013.01); *G05D 17/02* (2013.01); *Y02T 50/60* (2013.01)

(56) References Cited

U.S. PATENT DOCUMENTS

| | | |
|---|---|---|
| 3,286,470 A | 11/1966 | Gerlaugh |
| 3,312,448 A | 4/1967 | Hull, Jr. et al. |
| 3,543,520 A * | 12/1970 | Meshew .................. F02K 7/10 60/269 |
| 3,635,426 A * | 1/1972 | Stanley .................. B64C 27/18 244/17.11 |
| 3,762,667 A * | 10/1973 | Pender ................ B64C 29/0033 244/7 A |
| 3,844,110 A | 10/1974 | Widlansky et al. |
| 4,089,493 A | 5/1978 | Paulson |
| 4,270,408 A | 6/1981 | Wagner |
| 4,370,560 A | 1/1983 | Faulkner et al. |
| 4,605,185 A | 8/1986 | Reyes |
| 4,913,380 A | 4/1990 | Verdaman et al. |
| 5,174,109 A | 12/1992 | Lampe |
| 5,607,329 A | 3/1997 | Cho et al. |
| 5,799,484 A | 9/1998 | Nims |
| 5,927,644 A | 7/1999 | Ellis et al. |
| 6,105,697 A | 8/2000 | Weaver |
| 6,169,332 B1 | 1/2001 | Taylor et al. |
| 6,545,373 B1 | 4/2003 | Andres et al. |
| 6,606,578 B1 | 8/2003 | Henderson et al. |
| 6,652,235 B1 * | 11/2003 | Keith ...................... F01D 5/141 416/92 |
| 6,729,140 B2 | 5/2004 | Care et al. |
| 6,834,831 B2 | 12/2004 | Daggett |
| 6,976,655 B2 | 12/2005 | Thompson |
| 6,992,403 B1 | 1/2006 | Raad |
| 7,251,942 B2 | 8/2007 | Dittmar et al. |
| 7,267,300 B2 | 9/2007 | Heath et al. |
| 7,285,871 B2 | 10/2007 | Derouineau |
| 7,334,392 B2 | 2/2008 | Moniz et al. |
| 7,380,749 B2 | 6/2008 | Fucke et al. |
| 7,387,189 B2 | 6/2008 | James et al. |
| 7,417,337 B1 | 8/2008 | Suttie |
| 7,493,754 B2 | 2/2009 | Moniz et al. |
| 7,495,354 B2 | 2/2009 | Herrmann |
| 7,514,810 B2 | 4/2009 | Kern et al. |
| 7,528,499 B2 | 5/2009 | Suttie |
| 7,555,893 B2 | 7/2009 | Okai et al. |
| 7,665,689 B2 | 2/2010 | McComb |
| 7,677,502 B2 | 3/2010 | Lawson et al. |
| 7,752,834 B2 | 7/2010 | Addis |
| 7,806,363 B2 | 10/2010 | Udall et al. |
| 7,818,969 B1 | 10/2010 | Hotto |
| 7,819,358 B2 | 10/2010 | Belleville |
| 7,854,582 B2 | 12/2010 | Ullyott |
| 7,861,533 B2 | 1/2011 | Dooley |
| 7,905,449 B2 | 3/2011 | Cazals et al. |
| 7,922,445 B1 | 4/2011 | Pankey et al. |
| 7,926,259 B2 | 4/2011 | Orlando et al. |
| 7,944,077 B2 | 5/2011 | Fischer et al. |
| 7,952,244 B2 * | 5/2011 | Colin ...................... H02K 21/14 310/67 R |
| 7,958,727 B2 | 6/2011 | Arnold |
| 7,970,497 B2 | 6/2011 | Derouineau et al. |
| 7,976,273 B2 | 7/2011 | Suciu et al. |
| 8,016,228 B2 | 9/2011 | Fucke et al. |
| 8,033,094 B2 | 10/2011 | Suciu et al. |
| 8,039,983 B2 | 10/2011 | Cote et al. |
| 8,099,944 B2 | 1/2012 | Foster et al. |
| 8,109,073 B2 | 2/2012 | Foster et al. |
| 8,128,019 B2 | 3/2012 | Annati et al. |
| 8,141,360 B1 | 3/2012 | Huber |
| 8,162,254 B2 | 4/2012 | Roche |
| 8,193,761 B1 | 6/2012 | Singh |
| 8,220,739 B2 | 7/2012 | Cazals |
| 8,226,040 B2 | 7/2012 | Neto |
| 8,291,716 B2 | 10/2012 | Foster et al. |
| 8,317,126 B2 | 11/2012 | Harris et al. |
| 8,432,048 B1 | 4/2013 | Paulino |
| 8,469,306 B2 | 6/2013 | Kuhn, Jr. |
| 8,489,246 B2 | 7/2013 | Dooley |
| 8,492,920 B2 | 7/2013 | Huang et al. |
| 8,522,522 B2 | 9/2013 | Poisson |
| 8,549,833 B2 | 10/2013 | Hyde et al. |
| 8,552,575 B2 | 10/2013 | Teets et al. |
| 8,561,413 B2 | 10/2013 | Taneja |
| 8,568,938 B2 | 10/2013 | Gao et al. |
| 8,596,036 B2 | 12/2013 | Hyde et al. |
| 8,622,342 B2 | 1/2014 | Filho |
| 8,631,657 B2 | 1/2014 | Hagen et al. |
| 8,636,241 B2 | 1/2014 | Lugg et al. |
| 8,640,439 B2 | 2/2014 | Hoffjann et al. |
| 8,657,227 B1 | 2/2014 | Bayliss et al. |
| 8,672,263 B2 | 3/2014 | Stolte |
| 8,684,304 B2 | 4/2014 | Burns et al. |
| 8,692,489 B2 | 4/2014 | Maalioune |
| 8,723,349 B2 | 5/2014 | Huang et al. |
| 8,723,385 B2 | 5/2014 | Jia et al. |
| 8,727,270 B2 | 5/2014 | Burns et al. |
| 8,742,605 B1 | 6/2014 | Wilhide et al. |
| 8,745,990 B2 | 6/2014 | Burkholder et al. |
| 8,836,160 B1 | 9/2014 | Paterson et al. |
| 8,857,191 B2 | 10/2014 | Hyde et al. |
| 8,875,519 B2 | 11/2014 | Dooley |
| 8,890,343 B2 | 11/2014 | Bulin et al. |
| 8,925,660 B2 | 1/2015 | Bowdich et al. |
| 8,928,166 B2 | 1/2015 | Seger et al. |
| 8,939,399 B2 | 1/2015 | Kouros et al. |
| 8,950,703 B2 | 2/2015 | Bayliss et al. |
| 8,957,539 B1 | 2/2015 | Ralston |
| 8,997,493 B2 | 4/2015 | Brust et al. |
| 8,998,580 B2 | 4/2015 | Quiroz-Hernandez |
| 9,004,849 B2 | 4/2015 | Munsell et al. |
| 9,038,398 B2 | 5/2015 | Suciu et al. |
| 9,045,996 B2 | 6/2015 | Anghel et al. |
| 9,059,440 B2 | 6/2015 | Hotto |
| 9,068,562 B1 | 6/2015 | Budica et al. |
| 9,073,632 B2 | 7/2015 | Baumann |
| 9,102,326 B2 | 8/2015 | Anderson et al. |
| 9,143,023 B1 | 9/2015 | Uskert et al. |
| 9,190,892 B2 | 11/2015 | Anthony |
| 9,193,311 B2 | 11/2015 | Siegel et al. |
| 9,318,625 B2 | 4/2016 | Gatzke |
| 9,376,213 B2 | 6/2016 | Rolt |
| 9,487,303 B2 | 11/2016 | Siegel et al. |
| 9,493,245 B2 | 11/2016 | Salyer |
| 2003/0059304 A1 * | 3/2003 | Leeke ...................... F01D 5/20 416/97 R |
| 2004/0126236 A1 * | 7/2004 | Lee ......................... F01D 5/187 416/97 R |
| 2006/0037325 A1 | 2/2006 | Peters et al. |
| 2008/0056892 A1 | 3/2008 | Barton et al. |
| 2008/0276620 A1 | 11/2008 | Ullyott et al. |
| 2009/0179424 A1 | 7/2009 | Yaron |
| 2010/0038473 A1 | 2/2010 | Schneider et al. |
| 2011/0016882 A1 | 1/2011 | Woelke et al. |
| 2012/0119020 A1 | 5/2012 | Burns et al. |
| 2012/0153076 A1 | 6/2012 | Burns et al. |
| 2012/0167590 A1 | 7/2012 | Bettner |
| 2012/0209456 A1 | 8/2012 | Harmon et al. |
| 2012/0214605 A1 | 8/2012 | Snook et al. |
| 2013/0032215 A1 | 2/2013 | Streifinger |
| 2013/0036730 A1 | 2/2013 | Bruno et al. |

(56) References Cited

U.S. PATENT DOCUMENTS

| | | |
|---|---|---|
| 2013/0052005 A1 | 2/2013 | Cloft |
| 2013/0062885 A1 | 3/2013 | Taneja |
| 2013/0088019 A1 | 4/2013 | Huang et al. |
| 2013/0099065 A1 | 4/2013 | Stuhlberger |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0306024 A1 | 11/2013 | Rolt |
| 2013/0310994 A1 | 11/2013 | Schroeter |
| 2013/0327014 A1 | 12/2013 | Moulebhar |
| 2014/0010652 A1 | 1/2014 | Suntharalingam et al. |
| 2014/0058644 A1 | 2/2014 | Adibhatla et al. |
| 2014/0060995 A1 | 3/2014 | Anderson et al. |
| 2014/0084677 A1 | 3/2014 | Haillot |
| 2014/0151495 A1 | 6/2014 | Kuhn, Jr. |
| 2014/0245748 A1 | 9/2014 | Anghel et al. |
| 2014/0250861 A1 | 9/2014 | Eames |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0005990 A1 | 1/2015 | Burns et al. |
| 2015/0013306 A1 | 1/2015 | Shelley |
| 2015/0014479 A1 | 1/2015 | Bayliss et al. |
| 2015/0028594 A1 | 1/2015 | Mariotto |
| 2015/0033753 A1 | 2/2015 | Dooley |
| 2015/0033754 A1 | 2/2015 | Dooley |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0183522 A1 | 7/2015 | Ouellette |
| 2015/0380999 A1 | 12/2015 | Joshi et al. |
| 2016/0023773 A1 | 1/2016 | Himmelmann et al. |
| 2016/0053690 A1 | 2/2016 | Perkinson et al. |
| 2016/0061053 A1 | 3/2016 | Thomassin |
| 2016/0084104 A1 | 3/2016 | Sheridan et al. |
| 2016/0123174 A1 | 5/2016 | Ettridge et al. |
| 2016/0181641 A1 | 6/2016 | Hoffjann et al. |
| 2016/0304211 A1 | 10/2016 | Swann |
| 2016/0304214 A1 | 10/2016 | Himmelmann |
| 2016/0325929 A1 | 11/2016 | Abang, Jr. |
| 2016/0355272 A1 | 12/2016 | Moxon |

FOREIGN PATENT DOCUMENTS

| | | |
|---|---|---|
| WO | WO2014/072615 A1 | 5/2014 |
| WO | WO2014/123740 A1 | 8/2014 |

OTHER PUBLICATIONS

Pizzo et al., "Design considerations on energy storage system for electric aircraft propulsion", AEIT International Annual Conference (AEIT), 2016, pp. 1-6, 2016, Capri.

U.S. Appl. No. 15/245,257, filed Aug. 24, 2016.

http://aviationweek.com/awin/boeing-researches-alternative-propulsion-and-fuel-options, Aviation Week & Space Technology, Jun. 4, 2012.

Bradley et al., "Subsonic Ultra Green Aircraft Research, Phase II: N+4 Advanced Concept Development," NASA/CR-2012-217556, May 2012.

Simon Schramm, Damping of Torsional Interaction Effects in Power Systems, 2010.

Hyun Dae Kim et al., "Distributed Turboelectric Propulsion for Hybrid Wing Body Aircraft", Auxiliary systems, NASA Technical Reports Server (NTRS), Conference: London, pp. 22, Jan. 1, 2008.

* cited by examiner

PROPULSOR ASSEMBLY FOR AN AIRCRAFT

CROSS-REFERENCE TO RELATED APPLICATIONS

This application claims priority to U.S. Provisional Application No. 62/509,402, which was filed on 22 May 2017, and also is a continuation-in-part of U.S. patent application Ser. No. 15/430,052, which was filed on 10 Feb. 2017. The entire disclosures of these applications are incorporated herein by reference.

FIELD

The present subject matter relates generally to a propulsion system for an aircraft, and an aircraft including the same.

BACKGROUND

A conventional aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing.

Fuel costs are a major factor in air travel. The turbofan propulsion systems currently used on aircraft utilize jet fuel. This fuel can constitute anywhere from 20% to 40% of the cost of flying passengers. Reducing usage of jet fuel in transporting passengers or other cargo can significantly impact the cost of this type of transportation.

BRIEF DESCRIPTION

Aspects and advantages of the inventive subject matter will be set forth in part in the following description, or may be obvious from the description, or may be learned through practice of the inventive subject matter.

In one embodiment, an aircraft propulsor assembly includes a fan having a nacelle and plural fan blades radially disposed within the nacelle. The fan blades are configured to be rotated by torque generated by a turbine engine of an aircraft to generate thrust for propelling the aircraft. The assembly also includes an electric motor including a stator in the nacelle of the fan and a rotor in tips of two or more of the fan blades. The electric motor is configured to generate torque that also rotates the fan blades to generate thrust for propelling the aircraft. The assembly also includes a controller configured to reduce or prevent an increase in an operating temperature of the turbine engine of the aircraft by automatically supplanting at least some of the torque generated by the turbine engine with the torque generated by the electric motor.

In one embodiment, a method includes generating torque with a turbine engine of an aircraft to generate thrust for propelling the aircraft by rotating fan blades disposed in a nacelle of a fan of the aircraft, and generating torque with an electric motor of the aircraft to generate thrust for propelling the aircraft by rotating the fan blades of the aircraft. The electric motor includes a stator in the nacelle of the fan and a rotor in tips of two or more of the fan blades. The method also includes reducing or preventing an increase in an operating temperature of the turbine engine by automatically at least partially supplanting the torque generated by the turbine engine of the aircraft with the torque generated by the electric motor.

In one embodiment, an aircraft propulsor assembly includes an electric motor including a stator in a nacelle of a fan and a rotor in tips of two or more fan blades. The electric motor can be configured to generate torque to rotate the fan blades to generate thrust for propelling the aircraft that also includes a turbine engine for generating torque to rotate the fan blades and generate thrust for propelling the aircraft. The assembly also includes a controller configured to automatically activate the electric motor to at least partially supplant the torque generated by the turbine engine of the aircraft responsive to the controller determining that the aircraft is operating in one or more of an elevated ambient temperature and/or in a location associated with an increased risk for liquification of airborne contaminants inside the turbine engine of the aircraft.

These and other features, aspects and advantages of the present inventive subject matter will become better understood with reference to the following description and appended claims. The accompanying drawings, which are incorporated in and constitute a part of this specification, illustrate embodiments of the inventive subject matter and, together with the description, explain the principles of the inventive subject matter.

BRIEF DESCRIPTION OF THE DRAWINGS

A full and enabling disclosure of the inventive subject matter, including the best mode thereof, directed to one of ordinary skill in the art, is set forth in the specification, which refers to the appended figures, in which.

DETAILED DESCRIPTION

Figure 1:
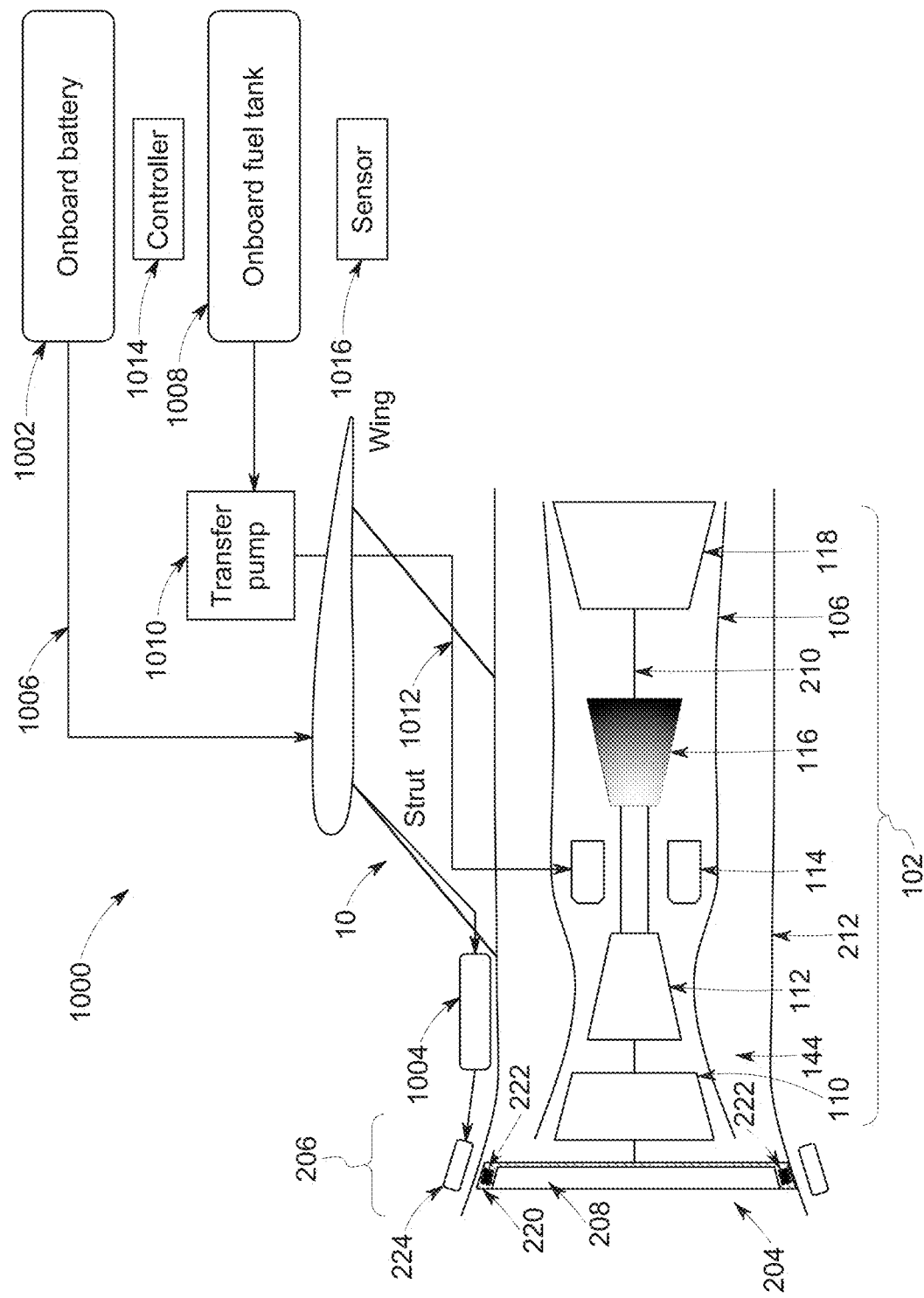
FIG. 1 is a schematic, cross-sectional view of an auxiliary propulsor assembly in accordance with another embodiment of the inventive subject matter.

Reference will now be made in detail to present embodiments of the inventive subject matter, one or more examples of which are illustrated in the accompanying drawings. The detailed description uses numerical and letter designations to refer to features in the drawings. Like or similar designations in the drawings and description have been used to refer to like or similar parts of the inventive subject matter. As used herein, the terms "first", "second", and "third" may be used interchangeably to distinguish one component from another and are not intended to signify location or importance of the individual components.

FIG. 1 is a schematic, cross-sectional view of an auxiliary propulsor assembly 1000 in accordance with another embodiment of the inventive subject matter. The propulsor assembly 1000 can represent one or more of the other propulsor assemblies shown and/or described in the applications that are incorporated by reference into this application, or optionally can replace one or more of these other propulsor assemblies in an aircraft 10.

The propulsor assembly 1000 includes a fan 204 having plural fan blades 208 spaced generally along a circumferential direction of the auxiliary propulsor assembly 1000. Additionally, the fan blades 208 are attached to a fan shaft 210. Each of the plurality of fan blades 208 includes an outer tip 220 along a radial direction R2 (not shown). The fan 204 is rotatable about a longitudinal centerline axis 202 not shown of the propulsor assembly 1000. The fan 204 includes a plurality of fan blades 208 and a fan shaft 210.

A fan casing or outer nacelle 212 and an electric motor 206 also are included in the propulsor assembly 1000, with the outer nacelle 212 surrounding the auxiliary fan 204. For the depicted embodiment, the outer nacelle 212 substantially completely surrounds the fan 204, and particularly the plurality of fan blades 208.

The electric motor 206 may not be configured to drive the auxiliary fan 204 through the fan shaft 210. For example, the electric motor 206 is coupled with the shaft 210 only by the fan blades 208 in one embodiment.

Instead, the electric motor 206 can be at least partially integrated into the tips 220 of one or more of the fan blades 208 for directly rotating the fan blades 208. More specifically, the electric motor 206 includes a rotor 222 (e.g., magnetic materials or electromagnets incorporated into the tips 220 of at least some, or all, of the fan blades 208) and a stator 224.

The rotor 222 is integrated into the tips 220 of one or more of the plurality of fan blades 208 and the stator 224 is positioned at least partially within the outer nacelle 212 of the auxiliary propulsor assembly 200. Notably, inclusion of the electric motor 206 having such a configuration may allow for an electric motor 206 having a reduced weight, which may in turn provide for additional efficiency benefits of the propulsor assembly 1000. Optionally, the rotor 222 of the motor 206 can be embedded in the fan blade shroud (not shown) of the turbofan engine.

The motor 206 can operate by the rotor 222 and the stator 224 being magnetically coupled to cause the rotor 222 (incorporated into the tips 220 of at least some of the fan blades 208) to rotate via control of the magnetic field between the rotor 222 and stator 224. The stator 224 can be supplied with electric current that is used to generate and change the magnetic field between the rotor 222 and stator 224 from an onboard battery 1002 via an inverter 1004.

The battery 1002 can represent one or more battery cells that store electric energy and that supply this stored energy to the inverter 1004 as a direct current via one or more conductive connections 1006, such as a direct current power bus. Optionally, the battery 1002 can represent one or more capacitors (e.g., supercapacitors), flywheels, or other energy storage devices. The battery 1002 can be at least partially charged while the aircraft 10 is on ground. For example, the battery 1002 can be charged while the aircraft 10 is stationary on the ground between flight missions or trips. Optionally, the battery 1002 can be at least partially charged during flight, as described below. The inverter 1004 modifies the direct current supplied from the battery 1002 into an alternating current, which drives the stator 224 to rotate the rotor 222. Rotation of the rotor 222 causes rotation of the fan blades 208, which propels or helps to propel the aircraft 10.

Other components of the turbine engine 102 include an outer casing 106, a low pressure (LP) compressor 110, a high pressure (HP) compressor 112, a HP turbine 116, and a LP turbine 118. A combustor 114 can receive fuel (e.g., jet fuel) from an onboard fuel tank 1008 via a transfer pump 1010 and one or more conduits 1012. The combustor 114 can consume this fuel to power and propel the aircraft. In one embodiment, heat rejection from the engine 102 can eliminate or reduce ice on the nacelle, fan blades 208, and/or shroud of the motor 206.

In the illustrated embodiment, the motor 206 is coupled with the fan 204 in a location that is ahead of the LP compressor 110 in a direction of flow through the engine 102. Optionally, the motor 206 can be in another location.

For example, the motor 206 could be positioned downstream from the LP compressor 110, such as between the LP compressor 110 and the HP compressor 112.

The propulsor assembly 1000 shown in FIG. 1 provides for the fan 204 to be powered for propelling the aircraft 10 using the gas turbine engine 102 and/or the motor 206. This assembly 1000 provides flexibility to the operator of the aircraft 10 to reduce or minimize one or more operating parameters, such as fuel consumption, noise generation, and/or emission generation. For example, the aircraft 10 can be propelled by the motor 206 during takeoff, while traveling at a cruising altitude, etc., to reduce the amount of fuel consumed, the level of acoustic noise generated, and/or the amount of emissions coming from the aircraft 10 relative to propelling the aircraft 10 using the engine 102. This flexibility is expected to provide anywhere from 10 to 30% improvement in mission fuel costs. Optionally, the aircraft 10 can be propelled by both the engine 102 and the motor 206 to increase the torque generated by the assembly 1000 for propelling the aircraft 10.

The aircraft 10 can switch between different energy sources for propelling the aircraft 10 to improve upon (e.g., optimize) mission benefits, such as fuel cost or speed, relative to the aircraft 10 being propelled by only the engine 102. The aircraft 10 can fly in a quiet mode of operation by turning the throttle of the engine 102 to idle while powering the fan 204 using the motor 206, which reduces noise generated by the engine 102. The aircraft 10 can fly in a reduced emission mode by turning the throttle of the engine 102 to idle while powering the fan 204 using the motor 206, thereby reducing or eliminating generation of condensate trails by reducing engine fuel flow in sensitive flight regimes. The aircraft 10 can fly using the motor 206 during elevated temperature time periods to reduce the firing temperature of the engine 102, thereby increasing on-wing time of the aircraft engine 102. The core speed and firing temperature limits on the engine 102 can be eliminated at the top of a climb of the aircraft 10 by propelling the aircraft 10 using the motor 206 at the top of a climb of the aircraft 10.

Optionally, the battery 1002 onboard the aircraft 10 can be charged by rotation of the fan blades 208. For example, rotation of the fan blades 208 by the turbine engine 102 (e.g., during reverse thrust of the engine 102) can be converted into electric current by the motor 206, similar to how electric current is created during regenerative braking of a traction motor. This current can be conducted to the battery 1002 and stored as electric energy. This electric energy can later be used to power the motor 206 as described above.

Optionally, the electric motor 206 can be used to partially supplant the torque generated by the turbine engine 102 (that rotates the fan blades 208 to generate thrust that propels the aircraft 10) responsive to the aircraft 10 operating in one or more designated conditions, as described in more detail below. For example, replacing a portion of the torque created by the turbine engine 102 with torque created by the electric motor 206 allows the turbine engine 102 to run cooler while still propelling the aircraft 10 with the same amount of thrust from the combined torque created by the engine 102 and motor 206.

In one embodiment, if the temperature of the hot gas path in the turbine engine 102 exceeds a designated, non-zero or other elevated threshold, then the electric motor 206 can be automatically activated to generate torque for rotating the fan blades 208 and the turbine engine 102 can be automatically controlled to reduce the torque generated by the turbine engine 102 for rotating the same fan blades 208. The turbine engine 102 can continue operating to generate torque for rotating the fan blades 208 to generate thrust, but can operate to generate less torque. This can allow the turbine engine 102 to run cooler, thereby potentially reducing the temperature inside the hot gas path of the engine 102.

Inclusion of the electric motor 206 also can allow for the aircraft 10 to be propelled by operation of a smaller turbine engine 102. The size of the turbine engine 102 for an aircraft 10 can be based on the top of climb of the aircraft 10. Running the electric motor 206 at the top of the climb of the aircraft 10 can allow for the turbine engine 102 to be smaller (and thereby lighter and less expensive) than if the same aircraft 10 did not include the electric motor 206.

In one embodiment, the aircraft 10 includes a controller 1014 that dictates which sources of torque are used to propel the aircraft 10 at different times. The controller 1014 represents hardware circuitry that includes and/or is connected with one or more processors (e.g., one or more microcontrollers, one or more field programmable gate arrays, one or more microprocessors, and/or one or more integrated circuits). The component(s) of the controller 1014 can determine (e.g., autonomously and/or based on operator input) whether one or more operational conditions exist that dictate or suggest operating the electric motor 206 to supplant the torque generated by the turbine engine 102. The controller 1014 can automatically activate and/or increase the torque created by the electric motor 206 (and optionally decrease but not eliminate the torque created by the turbine engine 102) to reduce the operating temperature (e.g., the temperature of the hot gas path) of the turbine engine 102. Reducing the operating temperature of the turbine engine 102 can allow the aircraft 10 to accelerate (e.g., take off from a surface) or travel in dusty and/or hot conditions while reducing the risk of dust liquifying onto components of the turbine engine 102 and reducing thermal degradation of the turbine engine 102 (e.g., that would otherwise occur during operation in those conditions without the motor 206). For example, the controller 1014 can determine that the aircraft 10 is taking off from a surface to an airborne state, determine the geographic location of the aircraft 10, determine one or more ambient conditions around the aircraft 10, and/or determine temperatures of the turbine engine 102. Based on one or more of these determinations, the controller 1014 can automatically activate the electric motor 206 to augment or supplant (e.g., partially but not entirely replace) the propulsion or propulsive force generated by the turbine engine 102, as described herein.

The aircraft 10 optionally includes one or more sensors 1016. The sensor 1016 shown in FIG. 1 can represent one or more sensors that generate and/or output data to the controller 1014 that are indicative whether the aircraft 10 is taking off to an airborne state from a ground-based state. For example, the sensor 1016 can represent an accelerometer that measures motion of the aircraft 10 and sends data signals to the controller 1014 indicative of the motion. The controller 1014 can examine the signals from the sensor 1016 to determine if the aircraft 10 is rapidly accelerating, such as the acceleration that occurs during takeoff of the aircraft 10.

Additionally or alternatively, the sensor(s) 1016 can include a location sensor, such as a global positioning system receiver, a dead reckoning system, a wireless triangulation device, or the like, that determines locations of the aircraft 10 and sends data signals to the controller 1014 that indicate the aircraft locations. The controller 1014 can examine the signals from the sensor 1016 to determine if the aircraft 10 is rapidly accelerating due to rapid changes in locations of the aircraft 10 (such as the acceleration that occurs during takeoff of the aircraft 10), if the aircraft 10 is in a location associated with increased dust or other particles (e.g., based on a database storing such information or weather predictions stored in the database), if the aircraft 10 is in a location associated with elevated ambient temperatures (e.g., based on a database storing such information or weather predictions stored in the database), or the like. The dust or other particles described herein can be referred to as airborne contaminants.

Additionally or alternatively, the sensor(s) 1016 can include a temperature-sensitive sensor, such as one or more thermocouples, exhaust gas temperature sensors, or the like. This sensor 1016 measures operating temperatures of the turbine engine 102, such as exhaust gas temperatures, manifold temperatures, or the like. The controller 1014 can examine the signals from the sensor 1016 to determine if the temperatures associated with operation of the turbine engine 102 are elevated (e.g., in excess of one or more threshold temperatures).

Additionally or alternatively, the sensor(s) 1016 can include an optical sensor, such as a camera, an infrared sensor, or the like. This sensor 1016 optically measures the presence of dust or other particulates in the air outside of the aircraft 10 and generates signals indicative of this presence. For example, the sensor 1016 can send static images, videos, infrared images, or the like, to the controller 1014. The controller 1014 can examine the signals from the sensor 1016 to determine if the aircraft 10 is in a location with dust or other particles that likely will enter the turbine engine 102 during operation.

Additionally or alternatively, the sensor(s) 1016 can include an input device, such as a keyboard, button, switch, lever, touchscreen, microphone, or the like. An operator can use the input device to notify the controller 1014 that the aircraft 10 is taking off from the ground or another surface (e.g., the input device can send a signal to the controller 1014 that represents the operator input).

The controller 1014 can monitor the signal(s) from the sensor(s) 1016 to determine whether to activate the electric motor 206. For example, the controller 1014 can monitor the signal(s) from the sensor(s) 1016 and activate the electric motor 206 during takeoff of the aircraft 10. Use of high performance engines such as the turbine engine 102 at high power during takeoff can result in gas temperatures inside the turbine engine 102 reaching and exceeding the liquification point of dust particles in the air by a substantial amount. Consequently, liquefied dust particles impact on and stick to the hot component surfaces of the turbine engine 102. This degrades performance of the engine 102, and can result in the engine 102 or components of the engine 102 needing significantly more repair and/or requiring repair sooner than scheduled.

The controller 1014 can automatically activate the electric motor 206 from an inactive state to generate additional torque during takeoff of the aircraft 10 to allow the turbine engine 102 to make less power. The controller 1014 can operate the turbine engine 102 at a lower setting or speed while supplanting the reduced torque from the turbine engine 102 with torque from the electric motor 206. Operating the turbine engine 102 at the lower settings or speeds can reduce the gas temperatures inside the turbine engine 102 below the liquefaction point of the dust particles. Concurrent operation of the electric motor 206 ensures that the aircraft 10 has sufficient thrust to takeoff.

The controller 1014 can determine when to activate the electric motor 206 based on the signals from the sensor 1016 in a variety of manners. For example, the controller 1014 can determine that the aircraft 10 is taking off from a surface based on increased accelerations measured by the sensor 1016 and/or based on one or more locations sensed by the sensor 1016. The controller 1014 can automatically activate the electric motor 206 and/or automatically reduce the throttle setting of the turbine engine 102 responsive to determining that the aircraft 10 is taking off. This can allow the turbine engine 102 to operate at a reduced output to prevent liquification of dust or particles in the turbine engine 102.

As another example, the controller 1014 can determine that the aircraft 10 is located in an area with dust or other particles in the air based on the locations sensed by the sensor 1016 and/or images or videos provided by the sensor 1016. The controller 1014 can automatically activate the electric motor 206 and/or automatically reduce the throttle setting of the turbine engine 102 responsive to determining that the aircraft 10 is in a location with dust or particles, or with elevated levels of dust or particles. This can allow the turbine engine 102 to operate at a reduced output to prevent liquification of dust or particles in the turbine engine 102.

As another example, the controller 1014 can determine that the aircraft 10 is located in an area with elevated temperatures and/or is operating at elevated temperatures based on the locations sensed by the sensor 1016 and/or temperatures measured by the sensor 1016 (e.g., temperatures of the turbine engine 102). The controller 1014 can automatically activate the electric motor 206 and/or automatically reduce the throttle setting of the turbine engine 102 responsive to determining that the aircraft 10 is in a location with elevated temperatures and/or is operating at an elevated temperature. This can allow the turbine engine 102 to operate at a reduced output to prevent liquification of dust or particles in the turbine engine 102.

As another example, the controller 1014 can determine that the aircraft 10 is taking off, is located in an area with elevated temperatures, is operating at elevated temperatures, and/or is operating in a location with dust or particles present based on operator input. The controller 1014 can automatically activate the electric motor 206 and/or automatically reduce the throttle setting of the turbine engine 102 responsive to this determination. This can allow the turbine engine 102 to operate at a reduced output to prevent liquification of dust or particles in the turbine engine 102 and/or reduce the temperature of the hot gas path within the turbine engine 102, while avoiding a decrease in the torque generated to rotate the fan blades 208 that generate thrust for the aircraft 10.

In one embodiment, the sensor(s) 1016 can measure the operating temperature of the turbine engine 102 and/or the controller 1014 can obtain the operating temperature of the turbine engine 102 measured by the sensor(s) 1016 at one or more previously designated trajectory points of the aircraft 10. For example, the sensor(s) 1016 can measure the operating temperature responsive to the aircraft 10 taking off from a surface, traveling at or in a top of climb of a trajectory of the aircraft 10, or at another location. As another example, the sensor(s) 1016 can repeatedly measure the operating temperature, and the controller 1014 can obtain the operating temperature that was measured by the sensor(s) 1016 while the aircraft 10 was located at the one or more previously designated trajectory points.

Replacing some (but not all) of the torque generated by the turbine engine 102 with torque generated by the electric motor 206 can interfere with operation of the LP compressor 110 in the turbine engine 102. The controller 1014 can monitor the turbine engine 102 as torque generated by the turbine engine 102 is replaced with torque generated by the electric motor 206 to maintain operability of the compressors 110, 112 in the turbine engine 102. For example, as torque from the turbine engine 102 is replaced by torque from the electric motor 206, a high-speed spool of the turbine engine 102 spins at a lower speed. This can back pressure the LP compressor 110 in the turbine engine 102 and cause the LP compressor 110 to stall. To prevent this stalling, the controller 1014 can examine the stall margin remaining of the LP compressor 110 and use variable guide vanes on the LP compressor 110 to reduce the mass flow and maintain operability of the LP compressor 110. For example, the controller 1014 can move variable guide vanes (e.g., in axial and/or rotational directions) to reduce the mass flow into the LP compressor 110 responsive to supplanting torque from the turbine engine 102 with torque from the electric motor 206.

Figure 2:
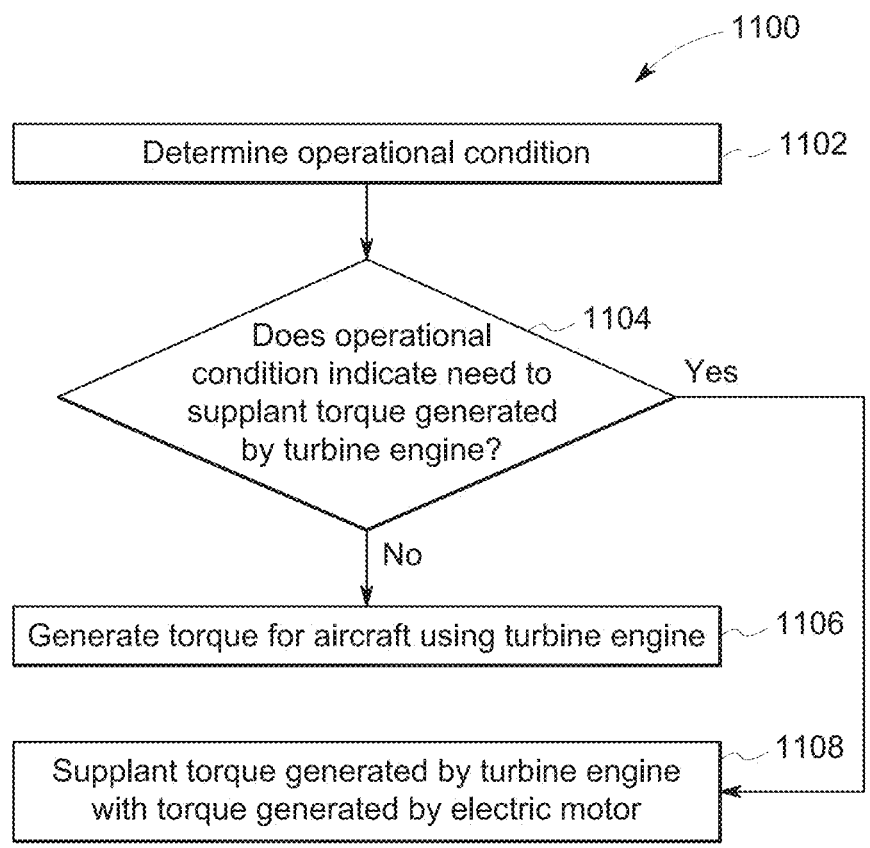
FIG. 2 illustrates a flowchart of one embodiment of a method for controlling operation of an aircraft.

FIG. 2 illustrates a flowchart of one embodiment of a method 1100 for controlling operation of an aircraft. The method 1100 can represent one or more operations performed by the controller 1014, sensor 1016, electric motor 206, and/or turbine engine 102, and optionally can be used by a person of ordinary skill in the art to enable that person to write software code that directs operation of the controller 1014.

At 1102, one or more operational conditions are determined. These operational conditions can be indicative of whether the aircraft 10 is taking off, whether the aircraft 10 is in a location associated with elevated temperatures, and/or whether the aircraft 10 is in a location associated with elevated amounts of airborne dust or other particles. The operational conditions can be represented by the signals communicated between the sensor(s) 1016 and the controller 1014.

At 1104, a determination is made as to whether the operational condition(s) indicate that the torque generated by the turbine engine should be at least partially supplanted by torque generated by the electric motor. For example, the controller 1014 can determine that the operational condition(s) indicate a risk of contaminants liquifying in the turbine engine of the aircraft or the turbine engine operating beyond safe operating temperatures. As described above, during takeoff of the aircraft 10, during operation of the aircraft 10 in locations with elevated temperatures, and/or during operation of the aircraft 10 in locations with dust or other airborne particles, operation of the turbine engine 102 can result in internal temperatures of the engine 102 liquifying contaminants such as dust or other particles or operation outside safe operating temperatures. The controller 1014 can examine the sensor data to determine if the aircraft 10 is taking off, to determine if the aircraft 10 is operating in a location with dust or airborne particles, to determine if the aircraft 10 is operating in a location with elevated temperatures, and/or to determine if the aircraft 10 is operating at elevated temperatures.

If the aircraft 10 is not taking off, if the aircraft 10 is not operating in a location with dust or airborne particles, if the aircraft 10 is not operating in a location with elevated temperatures, and/or if the aircraft 10 is not operating at elevated temperatures, then the controller 1014 may not need to change operation of the aircraft 10 to prevent or reduce liquification of dust or other particles inside the turbine engine 102 and/or to prevent the engine 102 operating beyond a previously designated upper temperature limit. As a result, flow of the method 1100 can proceed toward 1106.

But, if the aircraft 10 is taking off, if the aircraft 10 is operating in a location with dust or airborne particles, if the aircraft 10 is operating in a location with elevated temperatures, and/or if the aircraft 10 is operating at elevated temperatures (e.g., the turbine engine 102 would operate or is operating at a hot gas path temperature that exceeds the previously designated upper temperature limit), then the controller 1014 may change operation of the aircraft 10 to prevent or reduce liquification of dust or other particles inside the turbine engine 102 and/or to reduce the operating temperature (e.g., the temperature of the hot gas path) of the turbine engine 102. As a result, flow of the method 1100 can proceed toward 1108.

At 1106, torque is generated using the turbine engine. For example, the controller 1014 may deactivate the electric motor 206, prevent activation of the electric motor 206 by an operator or other system (e.g., by ignoring or disregarding requests or signals sent to activate the electric motor 206), and/or operate the electric motor 206 at a reduced speed. The controller 1014 can rely on torque generated entirely by the turbine engine 102 or predominantly by the turbine engine 102 to create thrust that propels the aircraft because the risk for liquification of dust or particles in the turbine engine 102 and/or the risk for operating the turbine engine 102 at too hot of a temperature is relatively low (e.g., relative to the sensor data indicating a risk of liquification or elevated operating temperatures).

At 1108, an operating temperature of the turbine engine is reduced or prevented from increasing by supplanting at least some of the torque generated by the turbine engine with torque generated by the electric motor. The controller 1014 can automatically activate the electric motor 206, reduce an operating speed of the turbine engine 102, and/or reduce a throttle setting of the turbine engine 102. The controller 1014 can at least partially replace torque generated by the turbine engine 102 with torque generated by the electric motor 206 to reduce temperatures within the turbine engine 102, while still generating sufficient thrust from the torque to propel the aircraft 10. This can prevent the operating temperature (e.g., the exhaust temperature, the temperature of the hot gas path, etc.) of the turbine engine 102 from increasing or can reduce the operating temperature. Optionally, supplanting the torque of the turbine engine 102 can prevent or reduce liquification of dust or particles inside the turbine engine 102, can allow the aircraft 10 to operate with the turbine engine 102 in elevated or unsafe temperatures, and/or can allow for the turbine engine 102 to be a smaller and lighter engine 102 (e.g., relative to an aircraft that does not include the motor 206).

In one embodiment, an aircraft propulsor assembly includes a fan having a nacelle and plural fan blades radially disposed within the nacelle. The fan blades are configured to be rotated by torque generated by a turbine engine of an aircraft to generate thrust for propelling the aircraft. The assembly also includes an electric motor including a stator in the nacelle of the fan and a rotor in tips of two or more of the fan blades. The electric motor is configured to generate torque that also rotates the fan blades to generate thrust for propelling the aircraft. The assembly also includes a controller configured to reduce or prevent an increase in an operating temperature of the turbine engine of the aircraft by automatically supplanting at least some of the torque generated by the turbine engine with the torque generated by the electric motor.

Optionally, the controller is configured to automatically at least partially supplant the torque generated by the turbine engine with the torque generated by the electric motor by one or more of activating the electric motor or reducing an operating speed of the turbine engine.

Optionally, the controller is configured to monitor a stall margin of a low-pressure compressor in the turbine engine and to reduce a mass flow into the low-pressure compressor responsive to supplanting at least some of the torque generated by the turbine engine with the torque generated by the electric motor.

Optionally, the controller is configured to automatically at least partially supplant the torque generated by the turbine engine of the aircraft with the torque generated by the electric motor responsive to the controller determining that the aircraft is taking off from a surface-based state to an airborne state.

Optionally, the assembly also includes one or more sensors configured to measure one or more of an acceleration or location of the aircraft. The controller can be configured to automatically activate the electric motor responsive to the one or more of the acceleration or location indicating that the aircraft is taking off from the surface-based state to the airborne state.

Optionally, the controller is configured to automatically at least partially supplant the torque generated by the turbine engine of the aircraft with the torque generated by the electric motor responsive to the controller determining that the aircraft is in a location having one or more of an airborne contaminant or an elevated ambient temperature.

Optionally, the assembly also includes one or more sensors configured to one or more of generate an image or video of the airborne contaminant, determine a location of the aircraft, and/or measure an ambient temperature outside of the aircraft. The controller can be configured to automatically activate the electric motor responsive to one or more of the image or video indicating a presence of the airborne contaminant, the location of the aircraft being associated with the presence of the airborne contaminant, and/or the ambient temperature exceeding a threshold temperature.

Optionally, the controller is configured to automatically at least partially supplant the torque generated by the turbine engine of the aircraft with the torque generated by the electric motor responsive to the controller determining that the operating temperature of the turbine engine exceeds a designated threshold.

Optionally, the assembly also includes one or more sensors configured to measure a temperature of exhaust gas of the turbine engine, a temperature of a hot gas path of the turbine engine, and/or a combination of the temperature of the exhaust gas and the temperature of the hot gas path as the operating temperature. The controller can be configured to automatically activate the electric motor responsive to the operating temperature exceeding a threshold temperature.

Optionally, the one or more sensors are configured to measure the operating temperature of the turbine engine at one or more previously designated trajectory points of the aircraft or the controller is configured to obtain the operating temperature of the turbine engine as measured by the one or more sensors at the one or more previously designated trajectory points of the aircraft.

In one embodiment, a method includes generating torque with a turbine engine of an aircraft to generate thrust for propelling the aircraft by rotating fan blades disposed in a nacelle of a fan of the aircraft, and generating torque with an electric motor of the aircraft to generate thrust for propelling the aircraft by rotating the fan blades of the aircraft. The electric motor includes a stator in the nacelle of the fan and a rotor in tips of two or more of the fan blades. The method also includes reducing or preventing an increase in an operating temperature of the turbine engine by automatically at least partially supplanting the torque generated by the turbine engine of the aircraft with the torque generated by the electric motor.

Optionally, the operation of automatically at least partially supplanting the torque generated by the turbine engine with the torque generated by the electric motor occurs by one or more of activating the electric motor or reducing an operating speed of the turbine engine.

Optionally, the operation of automatically at least partially supplanting the torque generated by the turbine engine of the aircraft with the torque generated by the electric motor occurs responsive to determining that the aircraft is taking off from a surface-based state to an airborne state.

Optionally, the operation of determining that the aircraft is taking off from the surface-based state occurs based on an acceleration or location of the aircraft.

Optionally, the operation of automatically at least partially supplanting the torque generated by the turbine engine of the aircraft with the torque generated by the electric motor occurs responsive to determining that the aircraft is in a location having one or more of an airborne contaminant or an elevated ambient temperature.

Optionally, the electric motor is automatically activated responsive to one or more of an image or video indicating a presence of the airborne contaminant, a location of the aircraft being associated with a presence of the airborne contaminant, and/or an ambient temperature exceeding a threshold temperature.

Optionally, the operation of automatically at least partially supplanting the torque generated by the turbine engine of the aircraft with the torque generated by the electric motor occurs responsive to the controller determining that the operating temperature of the turbine engine exceeds a designated threshold.

In one embodiment, an aircraft propulsor assembly includes an electric motor including a stator in a nacelle of a fan and a rotor in tips of two or more fan blades. The electric motor can be configured to generate torque to rotate the fan blades to generate thrust for propelling the aircraft that also includes a turbine engine for generating torque to rotate the fan blades and generate thrust for propelling the aircraft. The assembly also includes a controller configured to automatically activate the electric motor to at least partially supplant the torque generated by the turbine engine of the aircraft responsive to the controller determining that the aircraft is operating in one or more of an elevated ambient temperature and/or in a location associated with an increased risk for liquification of airborne contaminants inside the turbine engine of the aircraft.

Optionally, the controller is configured to automatically at least partially supplant the torque generated by the turbine engine of the aircraft with the thrust generated by the electric motor responsive to the controller determining that the aircraft is taking off from a surface-based state to an airborne state.

Optionally, the controller is configured to automatically at least partially supplant the torque generated by the turbine engine of the aircraft with the torque generated by the electric motor responsive to the controller determining that the aircraft is in a location having an airborne contaminant.

Optionally, the controller is configured to automatically at least partially supplant the torque generated by the turbine engine of the aircraft with the torque generated by the electric motor responsive to the controller determining that an operating temperature of the turbine engine exceeds a designated threshold.

Optionally, the controller also is configured to automatically reduce one or more of an operating speed and/or a throttle setting of the turbine engine responsive to determining an increased risk for liquification of the airborne contaminants inside the turbine engine of the aircraft.

This written description uses examples to disclose the inventive subject matter, including the best mode, and also to enable a person of ordinary skill in the art to practice the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft propulsor assembly comprising:
   a fan having a nacelle and plural fan blades radially disposed within the nacelle, the fan blades configured to be rotated by torque generated by a turbine engine of an aircraft to generate thrust for propelling the aircraft;
   an electric motor including a stator in the nacelle of the fan and a rotor in tips of two or more of the fan blades, wherein the electric motor is configured to generate torque that also rotates the fan blades to generate thrust for propelling the aircraft; and
   a controller configured to reduce or prevent an increase in an operating temperature of the turbine engine of the aircraft by automatically supplanting at least some of the torque generated by the turbine engine with the torque generated by the electric motor.

2. The assembly of claim 1, wherein the controller is configured to automatically at least partially supplant the torque generated by the turbine engine with the torque generated by the electric motor by one or more of activating the electric motor or reducing an operating speed of the turbine engine.

3. The assembly of claim 1, wherein the controller is configured to monitor a stall margin of a low-pressure compressor in the turbine engine and to reduce a mass flow into the low-pressure compressor responsive to supplanting at least some of the torque generated by the turbine engine with the torque generated by the electric motor.

4. The assembly of claim 1, wherein the controller is configured to automatically at least partially supplant the torque generated by the turbine engine of the aircraft with the torque generated by the electric motor responsive to the controller determining that the aircraft is taking off from a surface-based state to an airborne state.

5. The assembly of claim 4, further comprising one or more sensors configured to measure one or more of an acceleration or location of the aircraft, and wherein the controller is configured to automatically activate the electric motor responsive to the one or more of the acceleration or location indicating that the aircraft is taking off from the surface-based state to the airborne state.

6. The assembly of claim 1, wherein the controller is configured to automatically at least partially supplant the torque generated by the turbine engine of the aircraft with the torque generated by the electric motor responsive to the controller determining that the aircraft is in a location having one or more of an airborne contaminant or an elevated ambient temperature.

7. The assembly of claim 6, further comprising one or more sensors configured to one or more of generate an image or video of the airborne contaminant, determine a location of the aircraft, or measure an ambient temperature outside of the aircraft, and wherein the controller is configured to automatically activate the electric motor responsive to one or more of the image or video indicating a presence of the airborne contaminant, the location of the aircraft being associated with the presence of the airborne contaminant, or the ambient temperature exceeding a threshold temperature.

8. The assembly of claim 1, wherein the controller is configured to automatically at least partially supplant the torque generated by the turbine engine of the aircraft with the torque generated by the electric motor responsive to the controller determining that the operating temperature of the turbine engine exceeds a designated threshold.

9. The assembly of claim 8, further comprising one or more sensors configured to measure a temperature of exhaust gas of the turbine engine, a temperature of a hot gas path of the turbine engine, or a combination of the temperature of the exhaust gas and the temperature of the hot gas path as the operating temperature, wherein the controller is configured to automatically activate the electric motor responsive to the operating temperature exceeding a threshold temperature.

10. The assembly of claim 9, wherein the one or more sensors are configured to measure the operating temperature of the turbine engine at one or more previously designated trajectory points of the aircraft or the controller is configured to obtain the operating temperature of the turbine engine as measured by the one or more sensors at the one or more previously designated trajectory points of the aircraft.

11. A method comprising:
generating torque with a turbine engine of an aircraft to generate thrust for propelling the aircraft by rotating fan blades disposed in a nacelle of a fan of the aircraft;
generating torque with an electric motor of the aircraft to generate thrust for propelling the aircraft by rotating the fan blades of the aircraft, the electric motor including a stator in the nacelle of the fan and a rotor in tips of two or more of the fan blades; and
reducing or preventing an increase in an operating temperature of the turbine engine by automatically at least partially supplanting the torque generated by the turbine engine of the aircraft with the torque generated by the electric motor.

12. The method of claim 11, wherein automatically at least partially supplanting the torque generated by the turbine engine with the torque generated by the electric motor occurs by one or more of activating the electric motor or reducing an operating speed of the turbine engine.

13. The method of claim 11, wherein automatically at least partially supplanting the torque generated by the turbine engine of the aircraft with the torque generated by the electric motor occurs responsive to determining that the aircraft is taking off from a surface-based state to an airborne state.

14. The method of claim 13, wherein determining that the aircraft is taking off from the surface-based state occurs based on an acceleration or location of the aircraft.

15. The method of claim 11, wherein automatically at least partially supplanting the torque generated by the turbine engine of the aircraft with the torque generated by the electric motor occurs responsive to determining that the aircraft is in a location having one or more of an airborne contaminant or an elevated ambient temperature.

16. The method of claim 15, wherein the electric motor is automatically activated responsive to one or more of an image or video indicating a presence of the airborne contaminant, a location of the aircraft being associated with a presence of the airborne contaminant, or an ambient temperature exceeding a threshold temperature.

17. The method of claim 11, wherein automatically at least partially supplanting the torque generated by the turbine engine of the aircraft with the torque generated by the electric motor occurs responsive to the controller determining that the operating temperature of the turbine engine exceeds a designated threshold.

* * * * *